June 10, 1930.                G. J. FISHER                1,762,772
                              BELT CONVEYER
                         Filed Oct. 25, 1927          2 Sheets-Sheet 1

INVENTOR
Gathorne John Fisher
BY: Ruege, Boyce & Batheler
ATTORNEYS

June 10, 1930.  G. J. FISHER  1,762,772
BELT CONVEYER
Filed Oct. 25, 1927  2 Sheets-Sheet 2

INVENTOR
Gathorne John Fisher
BY:
ATTORNEYS

Patented June 10, 1930

1,762,772

UNITED STATES PATENT OFFICE

GATHORNE JOHN FISHER, OF BRIARLEA, PENYGARN, PONTYPOOL, WALES

BELT CONVEYER

Application filed October 25, 1927, Serial No. 228,542, and in Great Britain November 2, 1926.

This invention relates to belt conveyers, more especially for use in collieries but applicable elsewhere, and its object is to provide a belt conveyer in which the belt is driven by being pinched between rotating driving rolls.

As the present conveyer is mainly intended for use in coal seams the diameters of the driving rolls must be small, and therefore the diameter of any one roll cannot largely exceed that of another.

In the conveyer according to the invention, the belt of the conveyer is driven by being led and pinched between intergeared small driving rolls covered with rubber or the like yielding material and approximately equal in diameter. Preferably the belt also enwraps a substantial portion of the periphery of each of the adjoining rolls, whereby the usual frictional surface engagement of the belt is also invoked.

The driving rolls may be situated at one end, preferably the delivery end, of the conveyer or at a situation intermediate of its ends. In the latter case the driving rolls engage the underneath run of the belt, as the continuity of the upper, conveying run of the belt must not be interrupted.

As the drive of the belt by the grip thereof between rolls permits the driving to be effected intermediate of its ends and as such drive is independent of the overall tautness of the belt, such arrangement of drive enables the delivery end of the belt to extend along a vertically adjustable angularly displaceable jib or overhung bracket frame, the belt passing around a return roller thereon and being driven at a stationary situation elsewhere than on the jib frame.

An embodiment of the invention is illustrated on the accompanying drawing, in which:—

Figure 1:
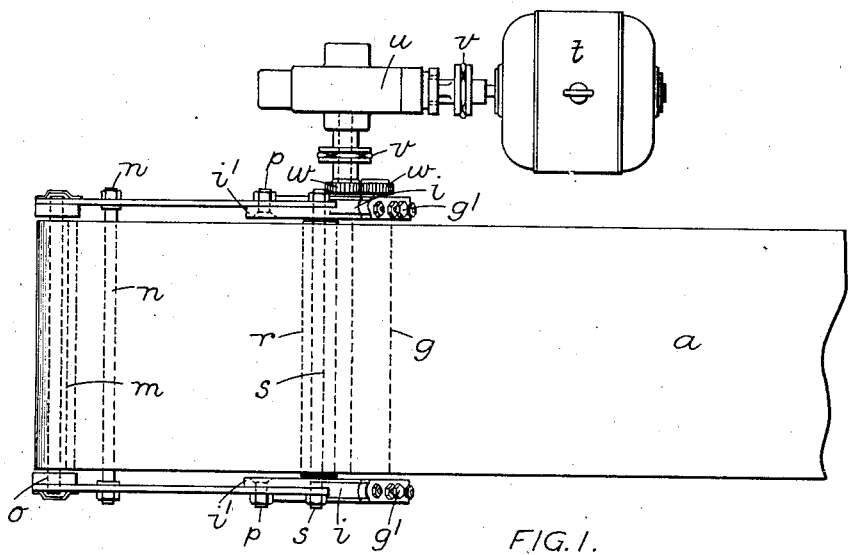
Figure 2:
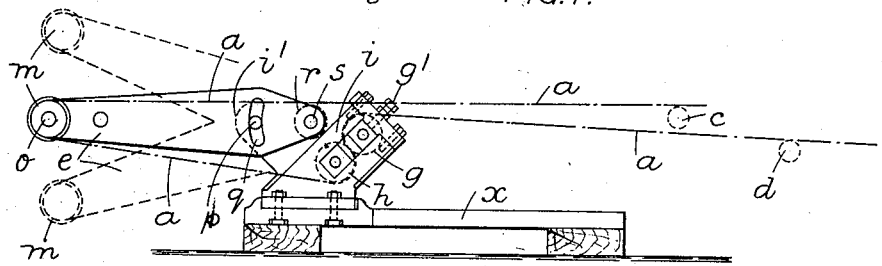
Figure 3:
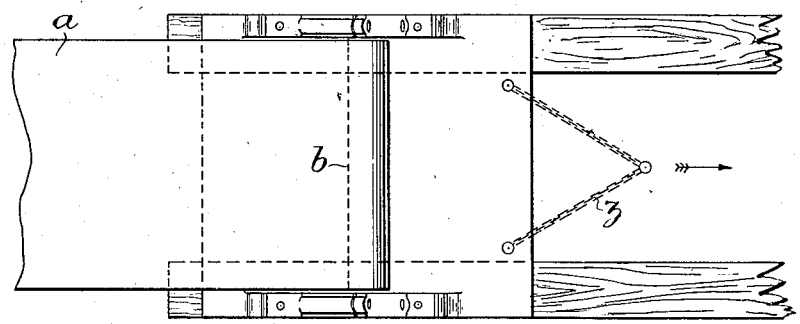
Figures 4, 5:
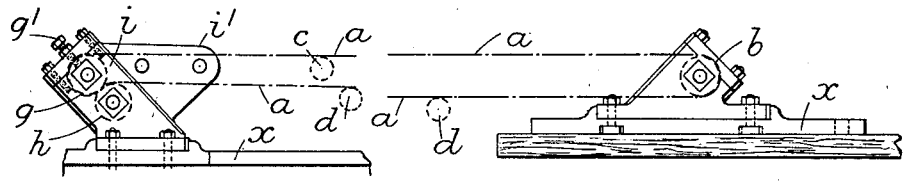
Figure 6:
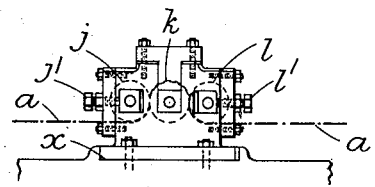

Fig. 1 is a plan and
Fig. 2 is a side elevation of the delivery end of the conveyer.
Fig. 3 is a plan of the return end of the conveyer and
Fig. 4 is a side elevation thereof.
Fig. 5 is a side elevation of the delivery end of the conveyer altered after the removal of an overhanging jib frame.
Fig. 6 is a side elevation and
Fig. 7 a partial plan of an arrangement of rolls for driving the conveyer belt intermediate of its ends.

Figure 8:
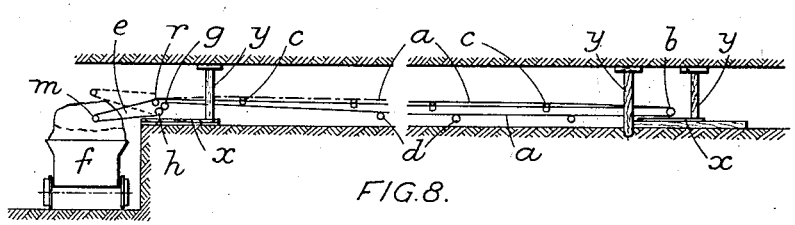
Figure 9:
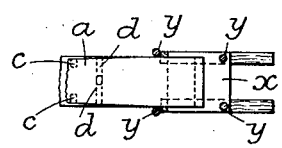

On a smaller scale:—
Fig. 8 is a sectional side elevation of the conveyer installed in a colliery working, and
Fig. 9 is a corresponding plan of the return end of the conveyer.

$a$ is the flexible conveyer belt composed for instance of woven material.

At the return end the conveyer belt $a$ as usual runs around a return roller $b$, and between its ends the upper run of the belt $a$ is supported on idlers $c$ with axes downwardly inclined towards the middle line of the belt to impart the usual shallow trough section to the belt, and the lower run is supported on idlers $d$ with horizontal axes.

The conveyer belt $a$ is driven by being led and pinched between driving rolls. These driving rolls are situated near one end of the conveyer.

Figs. 1, 2, 5 and 8 show the belt $a$ driven by rolls situated at or closely adjacent to the extremity of the delivery end of the conveyer. In Figs. 1, 2 and 8 the belt $a$ is shown led along and returning from a jib frame $e$, pivoted closely adjacent to the rolls and enabling the delivery end of the conveyer to overhang a vehicle, for instance a colliery tub $f$, Fig. 8, into which it delivers the conveyed material. Fig. 5 however shows the conveyer without the delivery jib frame $e$, and with the driving rolls located at the actual extremity of the delivery end of the conveyer.

The driving rolls shown in Fig. 5 consist of a pair of obliquely superposed rolls $g$, $h$, over, around and under the upper roll $g$ of which the belt is led to pass over the lower roll $h$ and is to be pinched between same and the upper roll $g$, the lower roll $h$ being located slightly inward of the extremity of the conveyer. The rolls $g$, $h$ are forced together by lock-nut provided set screws $g^1$ acting on sliding bearings at each end of the roll $g$.

The two rolls $g$, $h$ are of equal diameter and faced with rubber or other suitable yielding and gripping material and are intergeared speeds in directions such that their adjacent peripheral portions move in the same appropriate direction to draw the upper run of the belt $a$ towards the delivery end of the conveyer.

To centre the belt $a$ the rolls $g$, $h$ may have a barrel profile.

The two rolls $g$, $h$ are journalled between cheeks $i$ of a supporting frame, provided with projecting portions $i^1$ which when the frame is reversed, as will be described later, serve for the support of the above-mentioned jib frame $e$.

Alternatively to driving the belt $a$ by means of a pair of rolls $g$, $h$ at the delivery end of the conveyer, the return run of the belt may at some situation intermediate of its ends pass and be pinched between driving rolls. Such intermediate driving rolls for the purpose of reducing head room occupied conveniently are located side by side in substantially the same horizontal plane, instead of being superposed, and for symmetry and for enhancing the grip on the belt, consist of three rolls $j$, $k$, $l$, Figs. 6 and 7, the belt being led under the two outer rolls $j$, $l$ and over the middle roll $k$. The bearings of the outer rolls $j$, $l$ slide and are pressed towards the middle roll $k$ by lock-nut provided set screws $j^1$, $l^1$.

Intermediate driving rolls such as $j$, $k$, $l$ may be located at several separated intervals along the return run of the belt, and to provide uniformity of drive these several sets of rolls can be intergeared by pitch chains and sprocket wheels.

The method of driving the belt $a$ by means of pinching rolls by enabling the drive to be effected at the lower run of the belt and short of the actual extremity of the conveyer, permits the belt $a$ at the delivery end to be led around a return roller $m$ before passing to the pinching driving rolls $g$, $h$. This return roller $m$ at the delivery end can be situated at the free end of the vertically adjustable jib frame $e$ which, as shown in Figs. 1 and 2 and indicated in Fig. 8, can and preferably is attached to the projecting portions $i^1$ of the cheeks $i$ between which the rolls $g$, $h$ are journalled, after reversal of the supporting frame from the position shown in Fig. 5 to that shown in Figs. 1 and 2.

The jib frame consists of a pair of cheek plates or bars $e$ interconnected by a cross tie $n$ and by the spindle $o$ of the return roller $m$ at one end, and at the other end each pivoted by a spindle $s$ respectively to the projecting portions $i^1$ of the cheek plates $i$ of the supporting frame.

The jib frame $e$ projects substantially horizontally beyond the supporting frame and can be given an upward or downward inclination relatively thereto, and is clamped in the required position by nuts on bolts $p$ passing through the projecting portions $i^1$ of the cheeks $i$ of the supporting frame at a distance from the pivotal axis and through segmental slots $q$ in the cheek plates $e$ of the jib frame.

A roller $r$ is mounted on the pivot spindle $s$ of the jib frame $e$ to support and divert the belt $a$ when a downward inclination is imparted to the jib frame.

It will be observed that with the supporting frame reversed to take the jib frame $e$, the belt $a$ passes first under the lower roll $h$ and then over the upper roll $g$.

In Fig. 1 is also shown an electro-motor $t$ which drives the rolls $g$, $h$ through a reducing worm gear $u$ and flexible couplings $v$. Also spur wheels $w$ are shown in Fig. 1 and in Fig. 7 whereby the rolls $g$, $h$ and $j$, $k$, $l$ respectively are intergeared.

Figure 7:
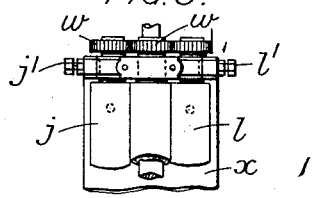

In Fig. 7 the structure of the middle roll $k$, which is the same as the others, is indicated as consisting of a relatively thick jacket of rubber on a stout steel shaft.

For colliery use the delivery and return ends of the conveyer can be mounted on bed plates $x$ resting on stout transverse wooden sleepers at the delivery end and on stout longitudinal wooden sleepers at the return end and held against the tension of the belt $a$ by pit props $y$ stepped in front of the return end bed plate $x$ and jammed between the roof of the working and the respective bed plate $x$, as shown in Figs. 8 and 9. The chain $z$ shown in Fig. 3 serves to draw the return end bed plate $x$ by a screw jack or the like to tighten the conveyer belt $a$ before securing the return end bed plate $x$ by the pit props $y$.

The direction in which the belt is driven may be reversed, for instance for conveying timber into working places underground.

I claim:

1. In a belt conveyer, a frame comprising cheek plates with projecting portions, a pair of driving rolls supported in said frame, a conveyor belt led and pinched between said rolls, a jib frame pivoted on said projecting portions of said cheek plates closely adjacent to said rolls, and a return roller for said conveyer belt on said jib frame.

2. In a belt conveyer, a frame comprising cheek plates with projecting portions, a pair of driving rolls supported in said frame, a conveyer belt led and pinched between said rolls, a pivot spindle in said projecting portions of said cheek plates closely adjacent to said rolls, a jib frame pivoted on said pivot spindle, and return roller for said conveyer belt on said jib frame.

3. In a belt conveyer, a frame comprising cheek plates with projecting portions, a pair of driving rolls supported in said frame, a conveyer belt led and pinched between said rolls, a pivot spindle in said projecting portions of said cheek plates closely adjacent to said rolls, a jib frame pivoted on said pivot spindle, a roller on said pivot spindle and a return roller for said conveyer belt on said jib frame.

4. In a belt conveyer, a frame comprising cheek plates with projecting portions, a pair of driving rolls supported in said frame, a conveyer belt led and pinched between said rolls, a jib frame comprising interconnected cheek plates pivoted on said projecting portions of said first-mentioned cheek plates closely adjacent to said rolls, and a return roller for said conveyer belt on said jib frame.

5. In a belt conveyer, a frame comprising cheek plates with projecting portions, a pair of driving rolls supported in said frame, a conveyer belt led and pinched between said rolls, a pivot spindle in said projecting portions of said cheek plates closely adjacent to said rolls, a jib frame comprising interconnected cheek plates pivoted on said pivot spindle, and a return roller for said conveyer belt on said jib frame.

6. In a belt conveyer, a frame comprising cheek plates with projecting portions, a pair of driving rolls supported in said frame, a conveyer belt led and pinched between said rolls, a pivot spindle in said projecting portions of said cheek plates closely adjacent to said rolls, a jib frame comprising interconnected cheek plates pivoted on said pivot spindle, a roller on said pivot spindle, and a return roller for said conveyer belt on said jib frame.

In testimony whereof I have signed my name to this specification.

GATHORNE JOHN FISHER.